(12) United States Patent
Fukui et al.

(10) Patent No.: US 9,242,571 B2
(45) Date of Patent: Jan. 26, 2016

(54) CHARGE MANAGING SYSTEM FOR AUTOMATED GUIDED VEHICLE

(71) Applicant: NISSAN MOTOR CO., LTD., Yokohama-shi, Kanagawa (JP)

(72) Inventors: Toshihito Fukui, Machida (JP); Mitsuru Hirayama, Isehara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/418,576

(22) PCT Filed: Aug. 1, 2013

(86) PCT No.: PCT/JP2013/070840
§ 371 (c)(1),
(2) Date: Jan. 30, 2015

(87) PCT Pub. No.: WO2014/021412
PCT Pub. Date: Feb. 6, 2014

(65) Prior Publication Data
US 2015/0258910 A1    Sep. 17, 2015

(30) Foreign Application Priority Data
Aug. 2, 2012    (JP) .................... 2012-171717

(51) Int. Cl.
*H02J 7/00*    (2006.01)
*B60L 11/18*    (2006.01)
(Continued)

(52) U.S. Cl.
CPC .............. *B60L 11/1862* (2013.01); *B60L 3/12* (2013.01); *B60L 11/18* (2013.01); *B60L 11/1824* (2013.01); *B62D 65/022* (2013.01); *G05D 1/0088* (2013.01); *H02J 7/0004* (2013.01); *H02J 7/0021* (2013.01); *H02J 7/0027* (2013.01);
(Continued)

(58) Field of Classification Search
CPC .............. H02J 7/00; B60L 11/18; G05D 1/02
USPC ....................... 701/22, 24; 320/108
See application file for complete search history.

(56) References Cited

U.S. PATENT DOCUMENTS

2005/0178632 A1 * 8/2005 Ross ................. B60L 5/005
                                                    191/10
2010/0217485 A1    8/2010 Ichishi
(Continued)

FOREIGN PATENT DOCUMENTS

JP    03-279883 A    12/1991
JP    2007-074800 A    3/2007
JP    2009-136109 A    6/2009

*Primary Examiner* — Tan Q Nguyen
(74) *Attorney, Agent, or Firm* — Foley & Lardner LLP (57) ABSTRACT

A system for managing charging of each of a plurality of automated guided vehicles that travels on an orbiting route in an unmanned manner using a battery mounted thereon as a driving source, in which the battery is charged at a charging station installed at a predetermined position on the orbiting route, includes: an after-charging voltage recording unit for recording a voltage after charging at the charging station for each of the automated guided vehicles; a charge priority setting unit for setting up charge priority of each of the automated guided vehicles on the basis of voltage values of voltages after charging recorded in the after-charging voltage recording unit; and a charging target value setting unit for setting up a charging target value of each of the automated guided vehicles on the basis of the charge priorities set up by the charge priority setting unit.

4 Claims, 7 Drawing Sheets

CHARGING VOLTAGE MANAGING TABLE

| AGV ID | 6-0001 | 6-0002 | 6-0003 | 6-0004 | 6-0001 | |
|---|---|---|---|---|---|---|
| PREVIOUS VOLTAGE VALUE | 24.2V | 24.8V | 22.9V | 24.2V | | |
| CHARGE PRIORITY | Low | Low | High | Default | | |
| CHARGING TARGET VALUE | 24.2V | 24.2V | 24.2V | Default | | |

(51) Int. Cl.
  *B60L 3/12* (2006.01)
  *B62D 65/02* (2006.01)
  *G05D 1/00* (2006.01)
(52) U.S. Cl.
  CPC ..... *G05B2219/31004* (2013.01); *H02J 7/0026* (2013.01); *Y02T 10/7005* (2013.01); *Y02T 10/7088* (2013.01)

(56) References Cited

U.S. PATENT DOCUMENTS

2012/0025942 A1* 2/2012 Bhat ............... B60L 11/182 336/221
2014/0077760 A1* 3/2014 Ichikawa ............ B60L 1/006 320/108

* cited by examiner

RECORDED DATA TABLE

| D131 | AGV ID 3, 4 bit |
|---|---|
| D132 | AGV ID 5, 6 bit |
| D133 | AGV ID 7, 8 bit |
| D134 | MONTH AND DAY |
| D135 | HOUR AND MINUTE |
| D136 | CHARGING TIME |
| D137 | INITIAL VOLTAGE |
| D138 | END VOLTAGE |
| D139 | LB BOX ABNORMAL CODE |
| D140 | CHARGER ABNORMAL CODE |

FIG. 5

CHARGING VOLTAGE MANAGING TABLE

| AGV ID | 6-0001 | 6-0002 | 6-0003 | 6-0004 | 6-0001 | |
|---|---|---|---|---|---|---|
| PREVIOUS VOLTAGE VALUE | 24.2V | 24.8V | 22.9V | 24.2V | | |
| CHARGE PRIORITY | Low | Low | High | Default | | |
| CHARGING TARGET VALUE | 24.2V | 24.2V | 24.2V | Default | | |

CHARGE MANAGING SYSTEM FOR AUTOMATED GUIDED VEHICLE

TECHNICAL FIELD

The present invention relates to a charge managing system for an automated guided vehicle that travels in an unmanned manner using an electric power of a battery mounted thereon as a driving source and carries out charging to a battery mounted on the vehicle at a charging station.

BACKGROUND ART

An automated guided vehicle of JP2007-74800A mounts a Nickel-Metal Hydride battery or Lithium-ion battery, which can be used even in the case of partially charging and discharging, thereon as a battery. In this automated guided vehicle, charging is started when a remaining capacity of the battery becomes a charging start capacity, and the charging is stopped when the remaining capacity reaches a charging stop capacity.

SUMMARY OF THE INVENTION

Now, it is common to use a plurality of automated guided vehicles in an assembly production line so as to travel on a traveling route on which assembling parts are loaded at a picking station, the assembling parts are transferred to a building station, the assembling parts are unloaded at the building station, and the automated guided vehicle then returns to the picking station again. The plurality of automated guided vehicles are continuously operated so as to sequentially supply the assembling parts required at the building station and to orbit and travel between the picking station and the building station.

In the plurality of automated guided vehicles continuously operated in this manner, a remaining capacity of a battery mounted thereon does not equally change depending upon a load such as a weight of the assembling parts mounted on the automated guided vehicle. A battery capacity of a part of the automated guided vehicles may be lowered earlier than those of the other automated guided vehicles. An automated guided vehicle whose battery capacity is lowered earlier has a high charging frequency at a charging station and requires a longer charging time compared with the other automated guided vehicles. For this reason, there has been a problem that, in a case where the plurality of automated guided vehicles orbit and travel on the same traveling route, it is impossible to ensure a charging time for an automated guided vehicle whose battery capacity is lowered earlier.

The present invention has been made by focusing on such a conventional problem. It is an object of the present invention to provide a charge managing system for an automated guided vehicle suitable for ensuring a charging time within an orbiting cycle for a plurality of automated guided vehicles that orbit and travel on the same traveling route.

A system according to the present invention for managing a charge of each of a plurality of automated guided vehicles that travel on an orbiting route in an unmanned manner using a battery mounted thereon as a driving source, in which the battery being charged at a charging station that is installed at a predetermined position on the orbiting route, includes: an after-charging voltage recording unit for recording a voltage after charging at the charging station for each of the automated guided vehicles; a charge priority setting unit for setting up a charge priority for each of the automated guided vehicles on the basis of voltage values of the voltages after charging recorded in the after-charging voltage recording unit; and a charging target value setting unit for setting up a charging target value for each of the automated guided vehicles on the basis of the charge priorities set up by the charge priority setting unit.

DESCRIPTION OF THE EMBODIMENTS

Hereinafter, an embodiment of the present invention will be described with reference to the accompanying drawings.

Figure 1:
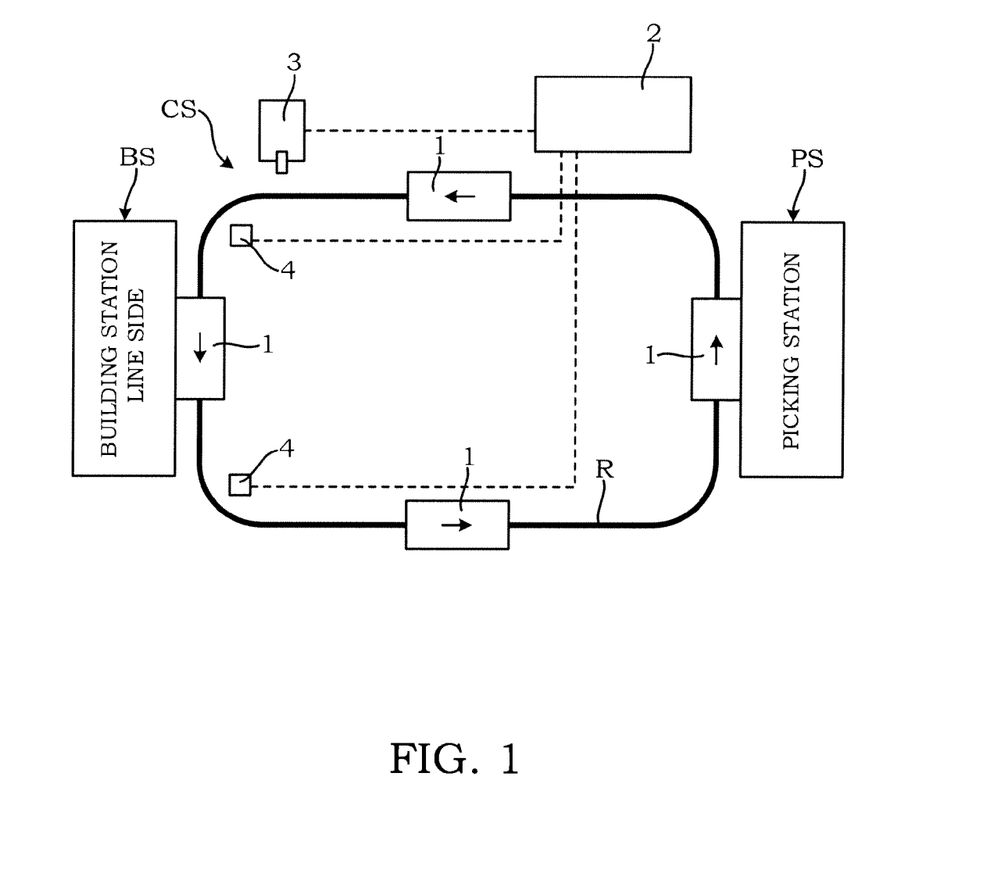
FIG. 1 is a conceptual diagram illustrating an example of a traveling course for an automated guided vehicle according to an embodiment of the present invention.

A traveling course for a transporting process in which automated guided vehicles 1 are utilized is a traveling route R on an orbit set up so as to go through a picking station PS and a building station BS of a production line, for example, as shown in FIG. 1. In the transporting process, it is configured so that the plurality of automated guided vehicles 1 can travel on this traveling route R, and traveling of each of the automated guided vehicles 1 is controlled by a facility-side control device 2.

The automated guided vehicle 1 repeats circulative traveling in which parts required at the building station BS are loaded onto the automated guided vehicle 1 at the picking station PS, the automated guided vehicle 1 travels on the traveling route R to convey the parts to the building station BS, the parts loaded at the picking station PS are unloaded, and the automated guided vehicle 1 then travels on the traveling route R again to return to the picking station PS. A charging station CS including an automatic charger 3 controlled by the facility-side control device 2 is arranged in front of the picking station PS on the traveling route R, for example. Further, ground-based stations 4, each of which carries out transmission and reception of signals between the automated guided vehicle 1 and the facility-side control device 2, are installed at an entrance and an exit to and from the building station BS, for example.

Figure 2:
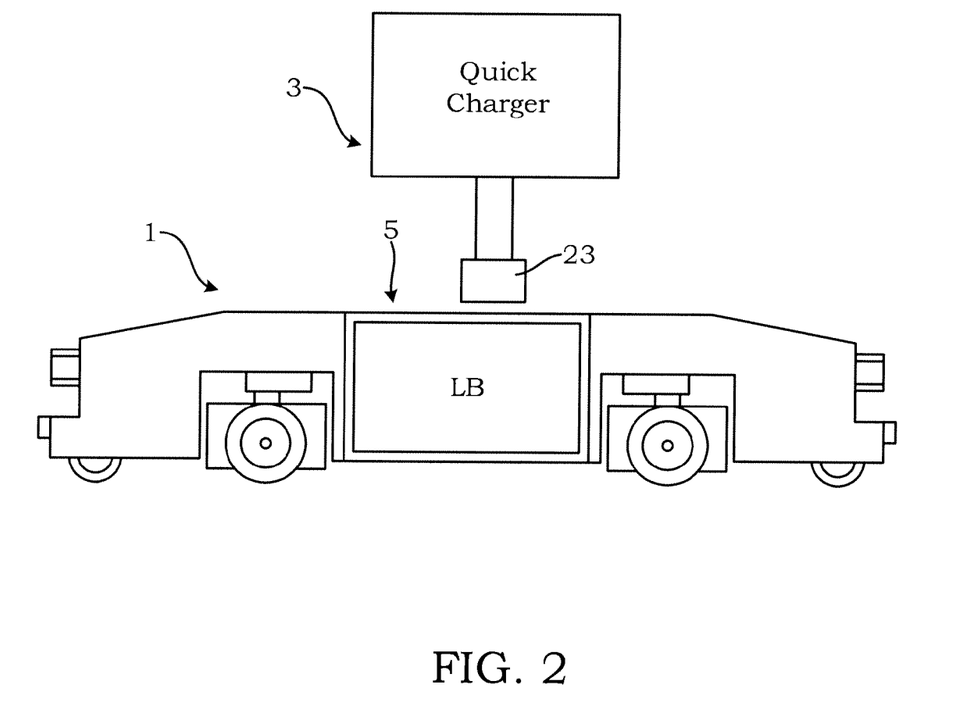
FIG. 2 is an explanatory drawing illustrating an outline of the automated guided vehicle and an automatic charger of a charging station.

As shown in FIG. 2, the automated guided vehicle 1 is equipped with a battery box 5 in the center of the vehicle, for example. The battery box 5 houses a battery B composed of a secondary battery (for example, a lithium-ion secondary battery), a charging/discharging monitor 11 for monitoring a state of the battery B, and the like. The automated guided vehicle 1 travels using the battery B as a driving power source.

Figure 3:
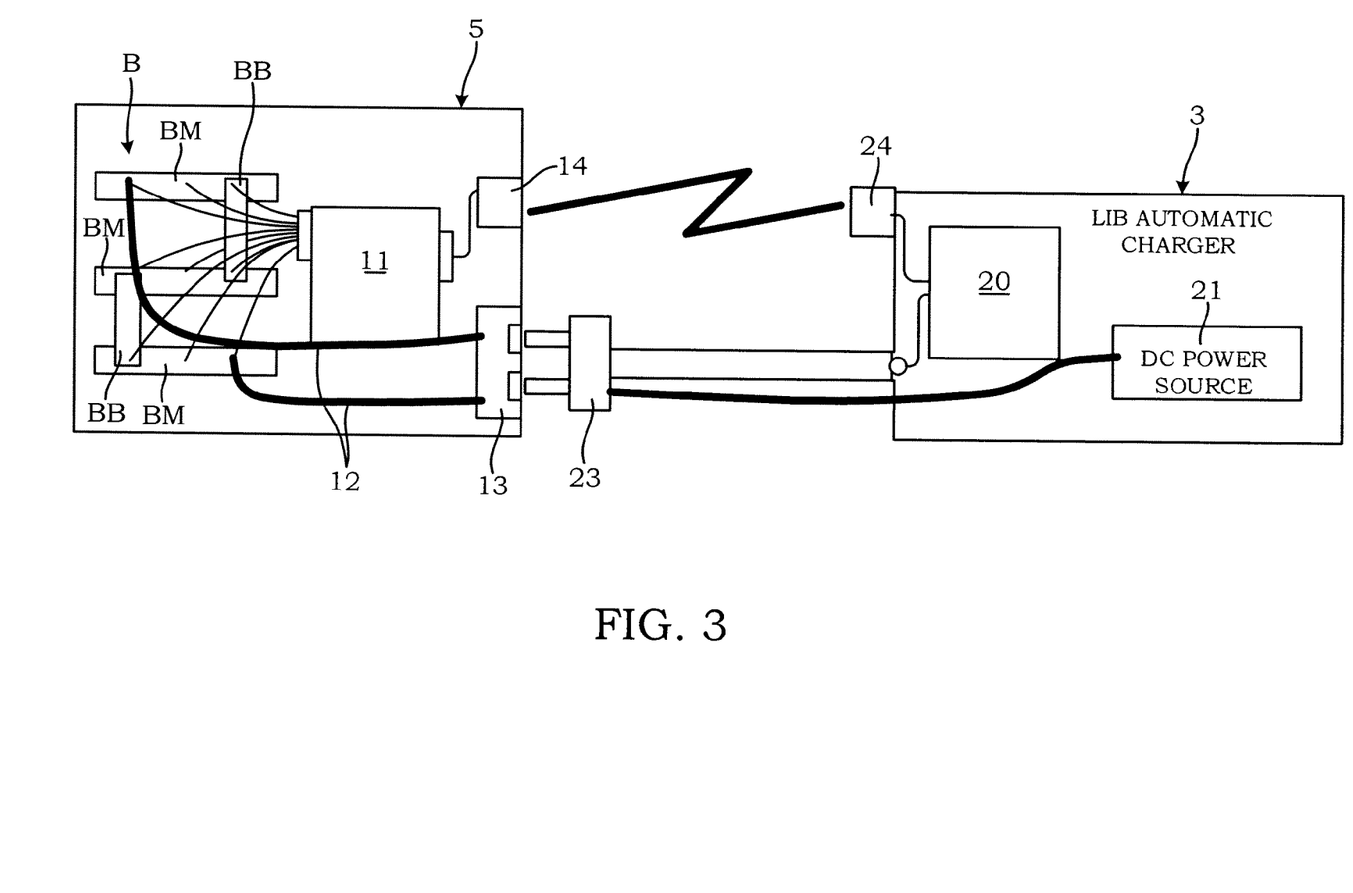
FIG. 3 is an explanatory drawing showing a relationship between a battery device of the automated guided vehicle and a battery charger in the charging station at a charging time.

The battery B contains battery modules BM connected in series by means of bus bars BB. In FIG. 3, three battery modules BM are connected in series. The battery module BM is configured by connecting a plurality of lithium-ion electric cells (cells) to each other in parallel or in series. A voltage of this battery module BM is about a little over 8V at a charging state. Since the three battery modules BM are connected in series in the battery B, an output voltage of the battery B becomes about 25V. Therefore, an over-charging voltage of the battery B is set up to 25V, for example, and an over-discharging voltage is set up to 18V, for example. The voltage for determining whether charging is required or not is set up to a voltage between the over-charging voltage and the over-discharging voltage, for example, 24.9V. In a case where the voltage is lower than this voltage, it is determined that the charging is required. In a case where the voltage is higher than this voltage, it is determined that the charging is not required. By making a voltage difference between the over-discharging voltage and the voltage by which it is determined that charging is to be started or terminated larger in this manner, the battery B is protected so as not to come to the over-discharging voltage by which deterioration of the battery B progresses.

A power incoming contactor 13 is arranged at an end portion of a feeding cable 12 toward the battery B so as to be exposed to an external surface of the battery box 5. A power feeding contactor 23 that extends or contracts from the automatic charger 3 in the charging station CS is caused to be connected to this power incoming contactor 13, whereby the battery B can be charged.

Further, the charging/discharging monitor 11 monitors and calculates the charging state of the battery B composed of a lithium-ion battery, as shown in FIG. 3. The charging/discharging monitor 11 operates so as to monitor and record a charge/discharge capacity (battery voltage) and a cell voltage of the battery B and each battery pack, the amount of current (ampere hour; Ah) of input and output of the battery B, an abnormality history of the battery B and the like every predetermined time (10 msec.). Further, the charging/discharging monitor 11 is configured to be capable of communicating these kinds of information to the facility-side control device 2 via the ground-based station 4 and the automatic charger 3 through a communication unit 14 (for example, optical communication).

Further, the charging/discharging monitor 11 is configured to display the fact that the battery B is in an abnormal state in a case where the voltage of each cell constituting the battery B becomes an over-discharging state of a shut-down threshold value (for example, 2.8 to 3V) or lower, and to cause the automated guided vehicle 1 to shut down (abnormally stop). A setup value of the shut-down threshold value can be changed, and is normally set up to 3.0V, for example. However, the shut-down threshold value is set up to a lower setup value (for example, 2.8V) while passing through the building station BS on the traveling route R, thereby suppressing a shut-down action within an area of the building station BS. More specifically, a shut-down inhibiting command is received from the ground-based station 4 installed at the entrance to the building station BS on the traveling route R via the communication unit 14, the setup value is changed from 3.0V to 2.8V. Further, when a shut-down inhibition releasing command is received from the ground-based station 4 installed at the exit from the building station BS on the traveling route R via the communication unit 14, the setup value is changed from 2.8V to 3.0V.

The automatic charger 3 includes: a DC power source 21 that can boost to an upper limit voltage (for example, 25V) of the battery B; a charge controller 20 that controls a charging current value and a charging voltage value to be supplied and applied to the battery B by means of the DC power source 21; and a communication unit 24 adapted to be capable of communicating with the communication unit 14 of each of the automated guided vehicles 1.

The communication unit 24 is configured so as to be capable of communicating, with the communication unit 14 of the automated guided vehicle 1, a charge/discharge capacity (voltage) of the battery B, the amount of current (ampere hour; AH) of the input and output of the battery B, an abnormality history of the battery B, other command signals, and the like.

The automated guided vehicle 1 travels using the battery B as the driving power source, and the charge/discharge capacity (voltage) of the battery B is lowered as the automated guided vehicle 1 travels. For this reason, the automated guided vehicle 1 is caused to temporarily stop when to pass through the charging station CS, and the charge/discharge capacity of the battery B of the automated guided vehicle 1 is confirmed between the automated guided vehicle 1 and the automatic charger 3 of the charging station CS via the communication units 14, 24. Then, it is determined whether the charge/discharge capacity (voltage) of the battery B at that time is required to be charged or not (that is, whether the voltage is lowered with respect to a charge unnecessary threshold voltage or not) at the side of the charging station CS. In a case where it is determined that the charging is required, the battery B of the automated guided vehicle 1 is charged by the automatic charger 3.

The charge unnecessary threshold voltage is set up to 24.9V, for example, as described above. Namely, it is determined that the charging is required in a case where the battery voltage is lowered with respect to the charge unnecessary threshold voltage. It is determined that the charging is not required in a case where the battery voltage is higher than the charge unnecessary threshold voltage. By making the voltage difference between the over-discharging voltage and the charge unnecessary threshold voltage by which charging is required larger in this manner, the battery B is protected so that the battery B does not come to the over-discharging voltage.

When the power feeding contactor 23 is caused to extend toward the power incoming contactor 13 of the automated guided vehicle 1 and the power feeding contactor 23 is connected to the power incoming contactor 13, the automated guided vehicle 1 becomes a chargeable state by confirming this connection. Then, a charge electric power is supplied to the automatic charger 3 from the DC power source 21. The charge controller 20 can carry out normal charging of a constant-current and constant-voltage method in order to charge the battery B. However, boosting charge of the constant-current and constant-voltage method in which a charging current larger than a charging current at a normal charging time is supplied to the battery B is carried out. The boosting charge is desired for the transporting process in which charge in a short time is required. In the charging of the constant-current and constant-voltage method, constant current charging (CC charge) in which a charging current with a constant current is supplied is carried out in the early stages of charging, and constant voltage charging (CV charge) in which a voltage is set to constant is carried out from the time when the battery voltage is raised to an upper limit voltage for charging (for example, 25V) by means of the charging to the time when a predetermined time elapses.

Figure 4:
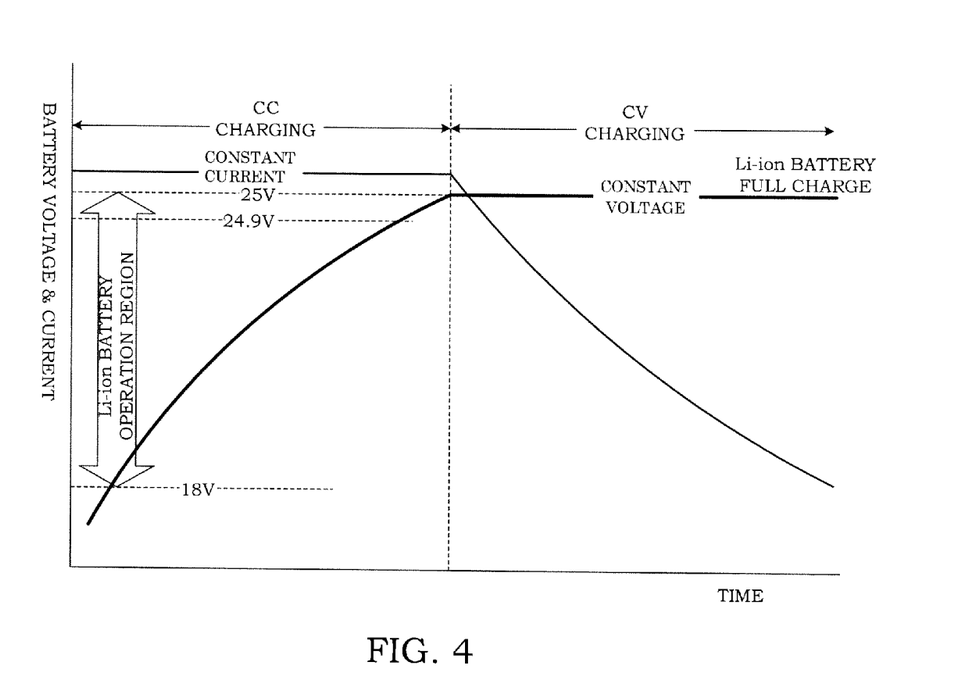
FIG. 4 is a charge characteristic diagram showing a change in a battery voltage at a charging time and a change in a charging current.

FIG. 4 is a charge characteristic diagram showing a change in a battery voltage at a charging time and a change in a charging current to be supplied. The battery voltage is raised gradually by means of the CC charge. When the battery voltage is raised to the upper limit voltage for charging (for example, 25V), the constant voltage charging (CV charge) with a constant voltage is carried out from that time to the time when the predetermined time elapses while the charging current is lowered. When the predetermined time elapses, the charge controller 20 brings down the DC power source 21 to stop charging.

Further, it is also possible to stop charging as termination of the charging at the time when the battery voltage of the automated guided vehicle 1 is raised to the charge unnecessary threshold voltage by carrying out the CC charge. Further, it is also possible to stop charging as termination of the charging when the CC charge is carried out only for a predetermined time set up in advance to raise the battery voltage of the automated guided vehicle 1 by the charging time. In a case where the charging is terminated at the time when to raise the battery voltage to the charge unnecessary threshold voltage or only for the predetermined time in this manner, it is possible to shorten the charging time. For this reason, it is suitable to charge the battery B of each of the automated guided vehicles 1 that orbit on the traveling route R. In the present embodiment, a charge stopping method in which charging is carried out only for a predetermined time and the charging is then stopped is adopted.

When the charging to the battery B is terminated at the charging station CS, the automatic charger 3 determines that the charging is terminated, and causes the power feeding contactor 23 to take refuge, thereby cutting off the connection with the power incoming contactor 13 of the automated guided vehicle 1. When the connection between the contactors 13, 23 is cut off, the automated guided vehicle 1 is caused to leave from the charging station CS and travel on the traveling route R.

In the meantime, the plurality of automated guided vehicles 1 described above are continuously operated so as to sequentially supply assembling parts required at the building station BS and to orbit and travel between the picking station PS and the building station BS. In the plurality of automated guided vehicles 1 continuously operated in this manner, an operation in which the automated guided vehicle 1 is caused to stop at the charging station CS every orbiting and traveling and an amount of electric power consumed by orbiting and traveling is charged to the battery B mounted thereon by the automatic charger 3 for an extremely short time (for example, one min.) included in an orbiting cycle is carried out.

Here, a remaining capacity of the battery B mounted thereon does not equally change depending upon a load such as a weight of the assembling parts mounted on the automated guided vehicle 1. A battery capacity of a part of the automated guided vehicles 1 may be lowered earlier than those of the other automated guided vehicles 1. It is necessary to make the charging time, for the automated guided vehicle 1 whose battery capacity is lowered at the charging station CS, longer compared with the other automated guided vehicles 1 to thereby recover the similar battery capacity to those of the other automated guided vehicles 1. For this reason, it is necessary to ensure the charging time for the automated guided vehicle 1 whose battery capacity is lowered compared with the other automated guided vehicles 1 within the orbiting cycle in which the plurality of automated guided vehicles 1 orbit and travel on the same traveling route R.

A charge managing system for an automated guided vehicle according to the present embodiment solves such a problem, and provides a charge managing system for the automated guided vehicles 1 capable of ensuring a charging time within an orbiting and traveling cycle for the plurality of automated guided vehicles 1 that orbit and travel on the same traveling route R.

Figure 5:
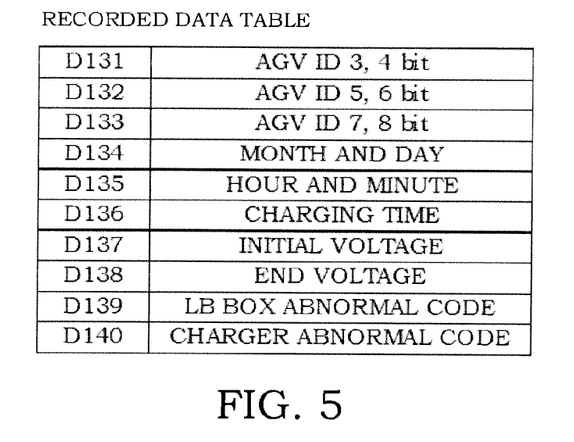
FIG. 5 is an explanatory drawing showing an example of a recorded data table of a facility-side control device.
Figure 6:
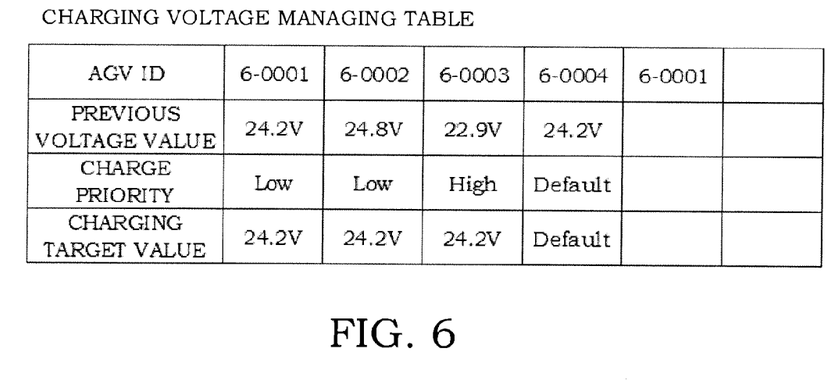
FIG. 6 is a charging voltage managing table for setting up a charge priority and a charging target value for the battery of the automated guided vehicle.
Figure 7:
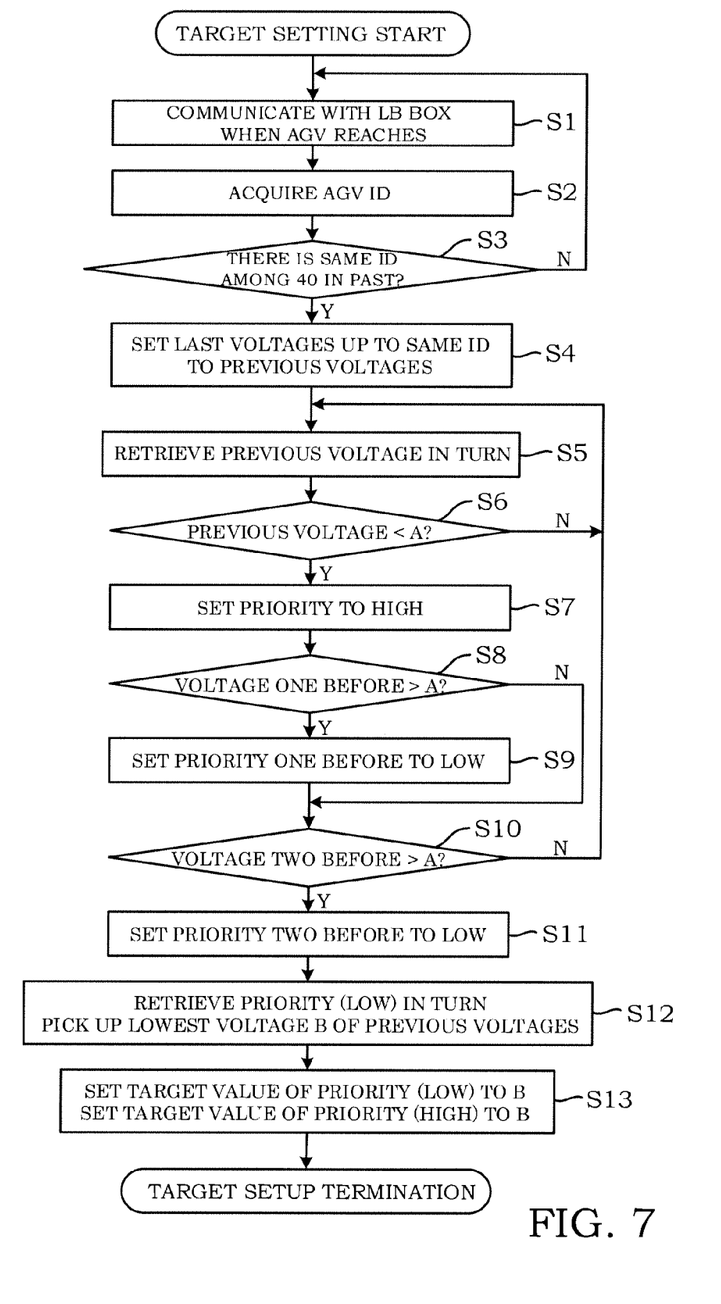
FIG. 7 is a control flowchart for setting up the charging voltage managing table.

For this reason, in the present embodiment, an individual ID number is set up to each of the automated guided vehicles 1; the ID number of the automated guided vehicle 1 is read out at the charging station CS; the charging state to each of the automated guided vehicles 1 at the charging station CS is recorded. A recorded data table in which these data are recorded in order of passing times is provided in the facility-side control device 2. The facility-side control device 2 carries out a control flowchart for calculating a charge priority order and a charging target on the basis of the data in the recorded data table, and sets up the charge priority order and charging target of each of the automated guided vehicles 1 on a charging voltage managing table.

The ID numbers of the automated guided vehicles 1, passing date and time and passing hour and minute thereof, a charging time to the battery B, a voltage before charging of the battery B, the voltage after charging of the battery B, and the like are acquired from the charging station CS whenever the automated guided vehicle 1 stops at the charging station CS. These data are recorded in the recorded data table in order of passing times, as shown in FIG. 5. Battery abnormal codes, battery charger abnormal codes and the like are further recorded in this recorded data table if necessary. These data are recorded for 1000 cases in the past, for example. These data are updated to the most recent data by erasing the oldest data whenever new data are written therein.

The charging voltage managing table is used for setting up a charging target of the automated guided vehicle 1 with each ID as shown in FIG. 6. A future charge priority and a charging target value of the automated guided vehicle 1 having each ID number can be set up on the basis of the voltage after charging previous time of the automated guided vehicle 1 with each ID. The future charge priority and the charging target value of the automated guided vehicle 1 having each ID number are set up by carrying out a control flowchart shown in FIG. 7.

Hereinafter, the charge managing system for the automated guided vehicles 1 according to the present embodiment will be described in detail on the basis of the control flowchart shown in FIG. 7.

When the automated guided vehicle 1 travels on the traveling route R and arrives at the charging station CS, the automated guided vehicle 1 stops at a predetermined position with respect to the automatic charger 3. The automatic charger 3 starts to communicate with the communication unit 14 of the automated guided vehicle 1 via the communication unit 24 (Step S1). Then, an individual ID of the automated guided vehicle 1 is acquired (Step S2), and it is determined whether there is the automated guided vehicle 1 with the same ID, for example, among forty automated guided vehicles 1 that have passed through the charging station CS in the past or not (Step S3).

In this determination, in a case where there is the automated guided vehicle 1 with the same ID among the automated guided vehicles 1 thus passed, the voltage values after charging of the automated guided vehicles 1 from the automated guided vehicle 1 with the same ID up to the present time are set up to voltage values previous time corresponding to the respective IDs (Step S4). Here, the voltage of ID6-0001 is 24.2V, the voltage of ID6-0002 is 24.8V, the voltage of ID6-0003 is 22.9V, and the voltage of ID6-0004 is 24.2V. By retrieving the automated guided vehicle 1 with the same ID that has passed previous time in this manner, it is possible to specify the number of the plurality of automated guided vehicles 1 that orbit and travel on the traveling route R.

Reference data for setting up the charge priority and the charging target when to charge next time are completed.

Subsequently, the voltage values previous time are retrieved in turn (Step S5), and it is determined whether there is an automated guided vehicle 1 in which voltage value previous time is lower than a priority charging voltage value A or not (Step S6). The priority charging voltage value A may be set up to a voltage value by which the automated guided vehicle 1 is allowed to orbit on the traveling route R in good time or an average value of the voltage values after charging. Here, the priority charging voltage value A is set up to 24V, for example. In this determination, in a case where there is an automated guided vehicle 1 in which the voltage value previous time is a voltage value lower than the priority charging voltage value A, the charge priority for the ID of the automated guided vehicle 1 is set up to high (High) (Step S7). Here, since the voltage value previous time of ID6-0003 is 22.9V and is a voltage value lower than the priority charging voltage value A, the charge priority of ID6-0003 is set up to High.

Subsequently, it is determined whether the voltage value previous time of the automated guided vehicle 1, which travels just before (one before) the automated guided vehicle 1 with the ID whose charge priority is set to High, is a voltage value higher than the priority charging voltage value A or not (Step S8). In this determination, in a case where the voltage value previous time is the voltage value higher than the priority charging voltage value A, the charge priority for the ID is set up to low (Low) (Step S9). Here, since the voltage value previous time of ID6-0002 is 24.8V and is a voltage value higher than the priority charging voltage value A, the charge priority of ID6-0002 is set up to Low.

Subsequently, it is determined whether the voltage value previous time of the automated guided vehicle 1, which travels two before the automated guided vehicle 1 with the ID whose charge priority is set to High, is a voltage value higher than the priority charging voltage value A or not (Step S10). In this determination, in a case where the voltage value previous time is the voltage value higher than the priority charging voltage value A, the charge priority for the ID is set up to low (Low) (Step S11). Here, since the voltage value previous time of ID6-0001 two before is 24.2V and is a voltage value higher than the priority charging voltage value A, the charge priority of ID6-0001 is set up to Low.

Subsequently, the IDs for which the charge priorities are set up to Low are retrieved in turn, and the lowest voltage value B of the voltage values previous time is picked up (Step S12). Then, the charging target value for the ID for which the charge priority is set up to Low is set up to the voltage value B. Further, the charging target value for the ID for which the charge priority is set up to High is also set up to the voltage value B (Step S13). Here, since the lowest voltage value B of the voltage values previous time for the IDs (ID6-0001, ID6-0002) whose priority is set up to Low is 24.2V, the charging target value of the voltage value B of each of the IDs (ID6-0001, ID6-0002) whose priority is set up to Low is set up to 24.2V. Further, the charging target value of the voltage value B for the ID (ID6-0003) whose priority is set up to High is also set up to 24.2V.

Figure 8:
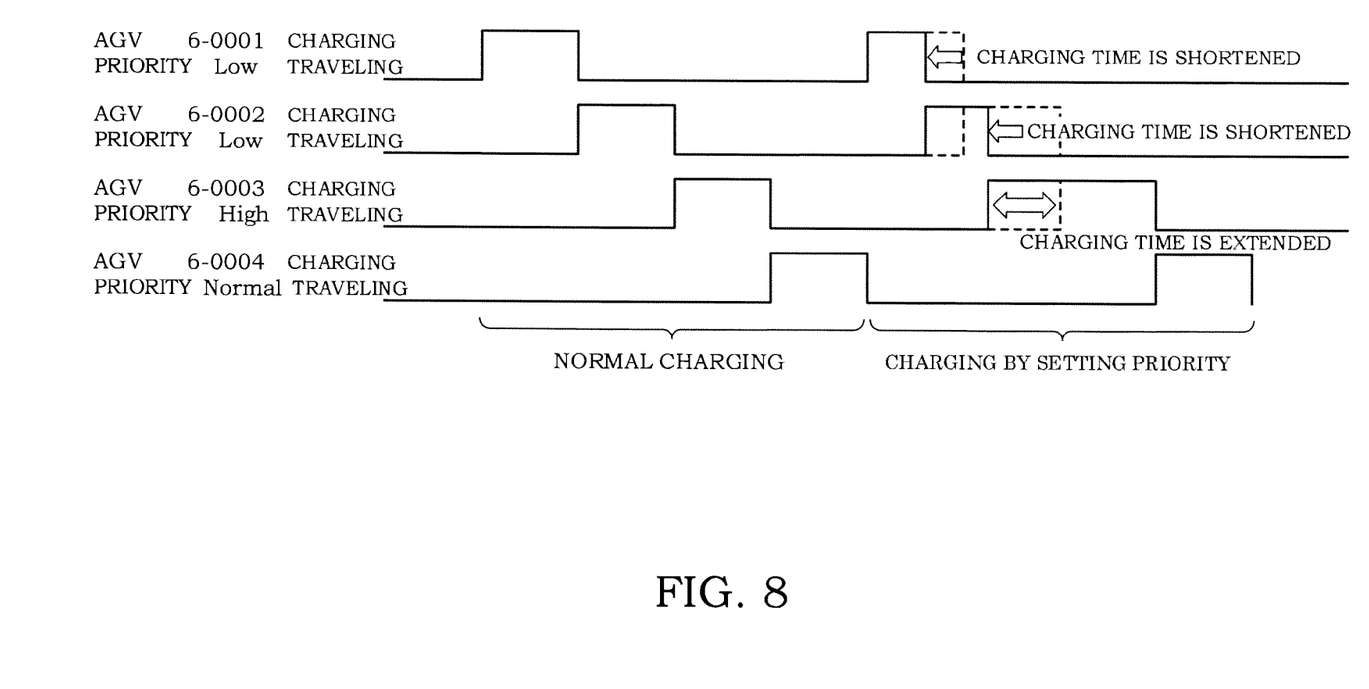
FIG. 8 is a timing chart for explaining the change in the charging time based on data set up using the charging voltage managing table of FIG. 6.

As described above, the charge priority of the automated guided vehicle 1 with the ID in which the voltage value previous time is the voltage value lower than the priority charging voltage value A is set up to High, and the charge priority of the automated guided vehicle 1 with the ID in which the voltage value previous time is the voltage value higher than the priority charging voltage value A is set up to Low. Further, the charging target value of the voltage of each of the automated guided vehicles 1 is set up to the lowest voltage value B of the voltage values previous time of the automated guided vehicles 1 with the IDs for which the charge priority is set up to Low. By setting up the charge priorities in this manner, a charging time for the automated guided vehicle 1 with the ID in which the voltage value previous time is the voltage value higher than the priority charging voltage value A and the charge priority thereof is set up to Low is shortened compared with a default time as shown in FIG. 8, because the charge start voltage of the automated guided vehicle 1 is actually higher. Further, a charging time for the automated guided vehicle 1 with the ID in which the voltage value previous time is the voltage value lower than the priority charging voltage value A and the charge priority thereof is set up to High becomes longer than the default time, because the charge start voltage is actually lower. However, since the charging time for the preceding automated guided vehicle 1 with the ID for which the charge priority is set to Low is caused to be shortened, it is possible to apply (or add) the amount of the charging time thus shortened to the charging time for the subsequent automated guided vehicle 1 with the ID for which the charge priority is set up to High. For this reason, this does not break or disarrange the cycle time of the automated guided vehicles 1 that orbit and travel on the traveling route R.

In this regard, in the embodiment described above, in order to select an automated guided vehicle 1 whose charge priority is to be set to Low, the charging voltage value previous time of the automated guided vehicle 1 that precedes (travels in front of) the automated guided vehicle 1 for which the charge priority is set up to High has been retrieved and specified. However, in order to select an automated guided vehicle 1 whose charge priority is to be set to Low, the charging voltage values previous time of the automated guided vehicles 1 in front and behind of the automated guided vehicle 1 whose charge priority is set to High may be retrieved and specified. Further, all of the automated guided vehicles 1 that are loaded onto the traveling route R may be retrieved and specified except for the automated guided vehicle 1 whose charge priority is set to High.

Further, the case of charging the battery B to the lowest voltage after charging among the automated guided vehicles 1 for each of which the charge priority is set up to Low has been explained as the charging target value. However, the present invention is not limited to this. For example, the charging target value may be set up to a voltage value by which the automated guided vehicle 1 is allowed to orbit on the traveling route R in good time or an average value of the voltage values after charging. Further, as the charging target value, a charging time for the automated guided vehicle 1 whose charge priority is set up to low may be shortened with respect to the charging time set up on the basis of an orbiting cycle time of the automated guided vehicle 1. A charging time for the automated guided vehicle 1 whose charge priority is set up to high may be extended.

The present embodiment can achieve effects described below.

(1) The system is a system for managing charging of each of the plurality of automated guided vehicles 1, which travels on the orbiting route R in an unmanned manner using the battery B mounted thereon as a driving source, and the battery B of which is charged at the charging station CS installed at a predetermined position on the orbiting route R. The system includes an after-charging voltage recording unit (the recorded data table) for recording the voltage after charging at the charging station CS for each of the automated guided vehicles 1. Further, the system includes: a charge priority setting unit (charging voltage managing table) for setting up a charge priority of each of the automated guided vehicles 1 on the basis of voltage values of the voltages after charging recorded in the after-charging voltage recording unit; and a charging target value setting unit (charging voltage managing table) for setting up a charging target value of each of the automated guided vehicles 1 on the basis of the charge priorities set up by the charge priority setting unit.

Namely, the system is configured so as to set up the charge priority for each of the automated guided vehicles 1 on the basis of the voltage values of the voltages after charging, and to set up the charging target value of each of the automated guided vehicles 1 on the basis of the charge priorities. For this reason, even in a case where the plurality of automated guided vehicles 1 are caused to travel on the orbiting route R, it is possible to recover the battery capacity of the automated guided vehicle 1 whose battery capacity is lowered without disarranging the orbiting and traveling cycle of each of the automated guided vehicles 1.

(2) The charge priority setting unit sets up a higher charge priority to an automated guided vehicle whose voltage value of the voltage after charging, recorded in the after-charging voltage recording unit, is lower than a priority charging voltage value set up in advance compared with an automated guided vehicle whose voltage value of the voltage after charging, recorded in the after-charging voltage recording unit, is higher than the priority charging voltage value. Namely, the charge priority of the automated guided vehicle 1 whose voltage after charging of the battery B is lower becomes higher, and the charge priority of the automated guided vehicle 1 whose voltage after charging of the battery B is higher becomes lower. For this reason, it is possible to enhance charging to the automated guided vehicle 1 whose voltage after charging of the battery B is lower.

(3) The charging target value setting unit sets up the charging target value so that the higher the charge priority set up by the charge priority setting unit is, the longer a charging time becomes. Namely, the charging time for the automated guided vehicle 1 whose charge priority is set up to high becomes longer, while the charging time for the automated guided vehicle 1 whose charge priority is set up to low becomes shorter. For this reason, it is possible to recover the battery capacity of the automated guided vehicle 1 whose battery capacity is lowered without disarranging the orbiting and traveling cycle of the plurality of automated guided vehicles 1 on the orbiting route R.

(4) The automated guided vehicle 1 includes the charging/discharging monitor 11 for monitoring the amount of charge/discharge of the battery B. This charging/discharging monitor 11 is configured to: monitor cell voltages of a plurality of battery packs that constitute the battery B; in a case where a cell voltage of any battery pack is reduced to a voltage value lower than a voltage value set up in advance, display the fact that the battery B of the automated guided vehicle 1 is in an abnormal state; and cause the automated guided vehicle 1 to stop. Further, in a case where each of the automated guided vehicles 1 travels in an area facing the building station BS in the production line, the voltage value by which it is determined whether the battery B is in the abnormal state or not is lowered compared with the case of traveling in other area. For this reason, it is possible to suppress abnormal stop of the automated guided vehicle 1 while passing through the area of the building station BS.

As described above, the embodiment of the present invention has been explained. However, the embodiment described above merely shows a part of examples of the application of the present invention, and the technical scope of the present invention should not be limited to the specific configurations of the embodiment described above.

For example, the embodiment described above can be combined appropriately.

The present application claims priority based on Japanese Patent Application No. 2012-171717, filed with the Japan Patent Office on Aug. 2, 2012, the entire content of which is expressly incorporated herein by reference.

The invention claimed is:

1. A charge managing system for an automated guided vehicle, the system managing charge of each of a plurality of automated guided vehicles that travels on an orbiting route in an unmanned manner using an electric power of a battery mounted thereon as a driving source, the battery being charged at a charging station that is located at a predetermined position on the orbiting route, the charge managing system comprising:
   an after-charging voltage recording unit for recording a voltage after charging at the charging station for each of the automated guided vehicles;
   a charge priority setting unit for setting up a charge priority of each of the automated guided vehicles on the basis of voltage values of the voltages after charging recorded in the after-charging voltage recording unit; and
   a charging target value setting unit for setting up a charging target value of each of the automated guided vehicles on the basis of the charge priorities set up by the charge priority setting unit.

2. The charge managing system for an automated guided vehicle according to claim 1,
   wherein the charge priority setting unit sets up a higher charge priority to an automated guided vehicle whose voltage value of the voltage after charging, recorded in the after-charging voltage recording unit, is lower than a priority charging voltage value set up in advance compared with an automated guided vehicle whose voltage value of the voltage after charging, recorded in the after-charging voltage recording unit, is higher than the priority charging voltage value.

3. The charge managing system for an automated guided vehicle according to claim 1,
   wherein the charging target value setting unit sets up the charging target value so that the higher the charge priority set up by the charge priority setting unit is, the longer a charging time becomes.

4. The charge managing system for an automated guided vehicle according to claim 1,
   wherein the automated guided vehicle includes a charge/discharge monitor for monitoring the amount of charge/discharge of the battery,
   wherein the charge/discharge monitor is configured to: monitor voltages of a plurality of cells that constitute the battery; in a ease where a voltage of any cell is reduced to a voltage lower than a voltage value set up in advance, display the fact that the battery of the automated guided vehicle is in an abnormal state; and cause the automated guided vehicle to stop, and
   wherein, in a case where each of the automated guided vehicles travels in an area facing a building station in a production line, the voltage value by which it is determined whether the battery is in the abnormal state or not is lowered compared with the case of traveling in other area.

* * * * *